Feb. 21, 1956 R. G. NEUHAUSER 2,735,957
ELECTRON TUBE AMPLIFIER CIRCUIT
Filed July 16, 1952
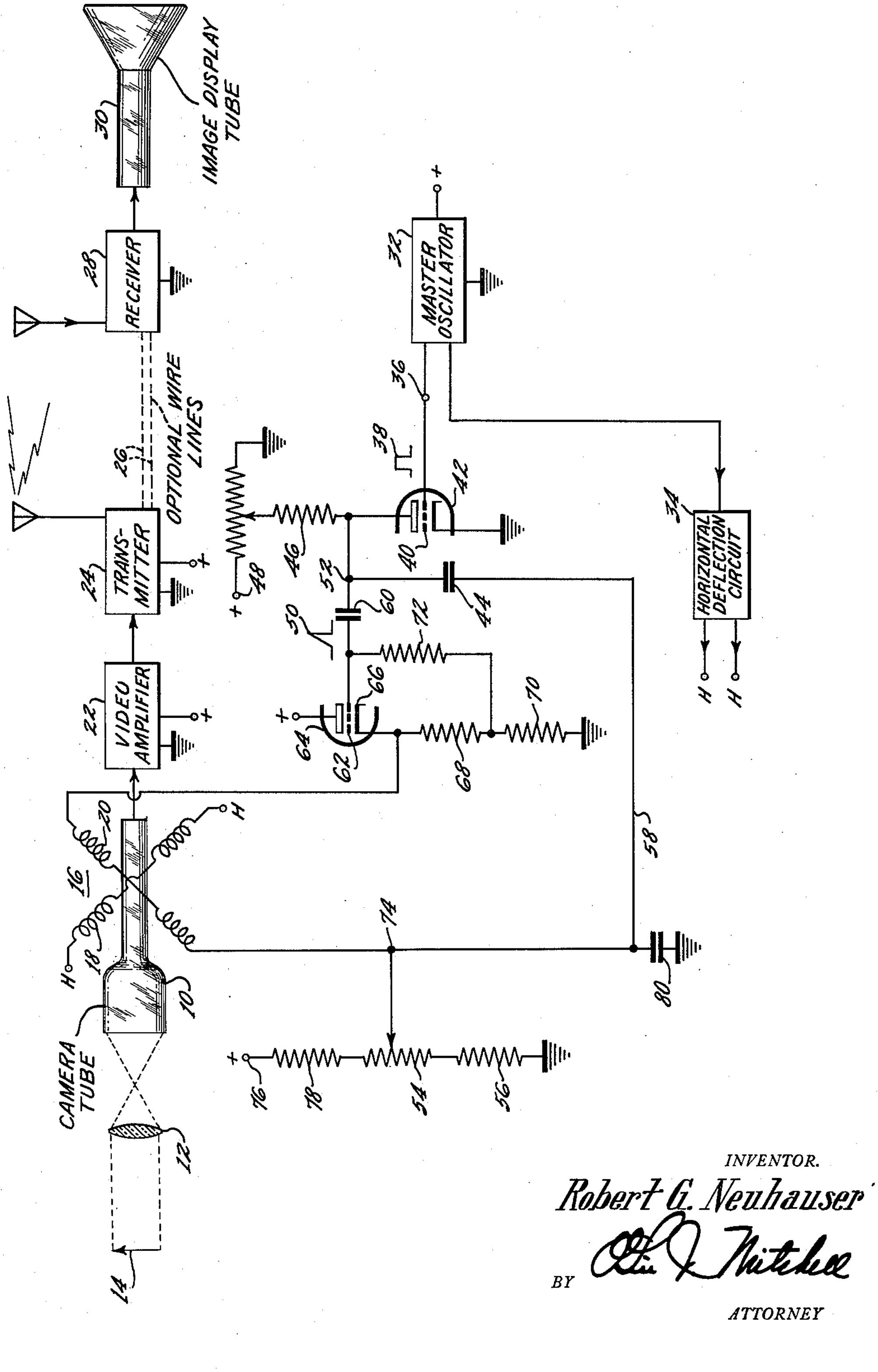
INVENTOR.
Robert G. Neuhauser
BY Olin J. Mitchell
ATTORNEY 2,735,957

ELECTRON TUBE AMPLIFIER CIRCUIT

Robert G. Neuhauser, Lancaster, Pa., assignor to Radio Corporation of America, a corporation of Delaware Application July 16, 1952, Serial No. 299,115

7 Claims. (Cl. 315—27)

The present invention relates to improvements in electron tube amplifier circuits, particularly of the output variety designated for the driving of low impedance load instrumentalities.

In more particularity, although not necessarily exclusively, the present invention relates to improvements in electron tube amplifiers of the type employed as deflection output amplifiers in television systems in which the output amplifier is designated to drive an electromagnetic deflection yoke.

The present invention in one of its forms relates to an improved deflection amplifier of the cathode follower type arranged for driving low impedance cathode ray beam deflection yokes with provisions for establishing a controllable beam positioning current through said deflection yoke.

In the field of electrical signal amplification it is frequently found necessary to provide a low impedance amplifier suitable for driving a low impedance load instrumentality. Even though the output of the amplifier may be of low impedance it may be found that certain reactive components in the load instrumentality produces certain undesirable phase shift of output current signals passing through the load instrumentality.

The above is illustrated in the case of cathode ray beam deflection circuits as found, for example, in television deflection circuits. In television deflection circuits it is generally desirable to provide a rather linear sawtooth of current through a deflection yoke winding, which yoke is positioned immediately adjacent the cathode ray beam picture reproducing tube or camera tube. In such applications it is further sometimes desirable to provide means for passing a D. C. current through the deflection yoke for the purpose of centering the electron beam in the cathode ray beam instrumentality. This generally requires connecting the deflection yoke in series with source of D. C. potential, which source is by-passed by a rather large capacitor so as to minimize the deleterious phase shift of deflection signal due to the inherent terminal impedance of the D. C. potential source. Where low deflection rates are involved, such as sixty cycles per second, the size of this by-pass capacitor must be both physically and electrically large, as well as costly.

The present invention in one of its more simple forms involves the utilization of a cathode follower type amplifier with the load instrumentality connected in series with an impedance means across the cathode output terminals of the amplifier. The signal voltage is then applied between the control electrode of the cathode follower amplifier and the impedance means connected in series with the load instrumentality.

In the particular case of a cathode ray beam electromagnetic deflection yoke the impedance means may be capacitive in nature and its terminals may be connected across a source of D. C. centering potential whose polarity is such as to oppose the normal cathode current flow through the deflection yoke which constitutes the load instrumentality. By such an arrangement the capacitor in shunt with the D. C. centering potential may be greatly reduced in size over prior art systems while the feed-back features of the present invention yield a high degree of signal current linearity through the deflection yoke.

Although the present invention finds particularly useful application in the field of deflection signal output amplifiers and is more fully hereinafter described with particular reference thereto, it will be appreciated that load instrumentalities other than cathode ray beam deflection yoke and electrical signals other than deflection signals may be utilized in connection with the novel electron amplifier structure flowing from the present invention.

It is, therefore, an object of the present invention to provide an improved electron tube amplifier particularly adapted to the driving of low impedance load instrumentalities.

It is further an object of the present invention to provide an electron tube amplifier suited for delivering cathode ray beam deflection signals to an electromagnetic deflection yoke in such a fashion as to minimize current wave form distortion in the deflection yoke.

It is still a further object of the present invention to provide a deflection output amplifier for driving an electromagnetic deflection yoke in such a way as to provide ready control of static beam centering currents through the deflection yoke.

It is still a further object of the present invention to provide an improved deflection output amplifier for electromagnetic deflection yokes of such a type as to minimize the physical size and cost of the amplifier components, and at the same time, provide maximum flexibility in the application of beam centering potentials to the deflection yoke.

A more complete understanding of the present invention in addition to the other objects and features of advantage will be understood from the following description, especially in connection with the accompanying drawings in which there is shown a preferred embodiment of the present invention as applied to television deflection systems.

Looking now at the drawings, there is indicated at 10 a television camera means which may be of the iconoscope or orthicon variety, as described in an article entitled "Portable television equipment" by M. A. Trainer in the "Proceedings of the I. R. E.," for January 1942, page 101. An optical image for the television camera tube 10 is provided by some suitable lens system 12 collecting light from an object 14. An electromagnetic deflection yoke 16 comprising a horizontal deflection winding 18 and a vertical deflection winding 20 is adjacent the camera tube 10 for deflecting the electron beam therein. As the electron beam is caused to scan a target within the camera tube 10 a video signal is developed which may be applied to a video amplifier 22, which in turn drives a transmitter 24. The transmitter 24 may either be of the radio type suitable for broadcast radiation or may be of the type designed to drive a wire line or coaxial cable as indicated by the dotted lines 26. At some remote point a receiver 28 may be employed to receive the signals produced by the transmitter 24 and reproduce a television image by means for example of a kinescope 30.

Synchronization of a deflection circuit for the camera tube 10 is derived from some form of master oscillator circuit 32. The output of the master oscillator circuit 32 is applied to a horizontal deflection circuit 34 whose output terminals H—H are designated for the connection with the corresponding terminals of the horizontal deflection winding 18. Another output of the master oscillator 32 available at terminal 36 is suitable for driving the vertical deflection circuit for the camera tube 10.

The master oscillator 32 may take a number of well known forms one of which is illustrated in the June 1950 issue of "Electrical Communications," page 109, in an article by R. W. Sanders, entitled "Industrial television systems."

In the arrangement shown in the drawing, a vertical synchronizing pulse 38 produced by master oscillator 32 is applied to the control electrode 40 of a sawtooth discharge tube 42. The purpose of this tube is to periodically discharge a sawtooth forming capacitor 44 during the positive going periods of each of the pulses 38. Since the sawtooth capacitor 44 is connected through a charging resistor 46 to a positive power supply terminal 48, a sawtooth wave form 50 will be developed at the terminal 52. The lower extremity of the sawtooth forming capacitor 44 is connected with a datum or ground potential through a potentiometer 54 and resistance 56 via circuit path 58.

In accordance with the present invention the sawtooth deflection signal appearing at terminal 52 is capacitively coupled by a capacitor 60 to the control electrode 62 of the output amplifier discharge tube 64. The cathode 66 of the output amplifier discharge tube is connected through resistances 68 anrd 70 to a datum or ground potential. The resistance 72 provides a D.-C. return for the control electrode 62. The vertical winding 20 of the deflection yoke 16 is then connected to the cathode 66 and the terminal 74 at the arm of the potentiometer 54.

In further accordance with the present invention a D.-C. potential is applied to the upper end of the potentiometer 54 from a positive power supply terminal 76 through a resistance 78 while a by-pass capacitor 80 is connected from the terminal 74 to a datum or ground potential.

In the operation of the present invention it will be seen that at least a portion of the cathode current of the discharge tube 64 will flow through the vertical deflection winding 20 to ground via potentiometer 54 and resistance 56. At the same time a current is urged to flow through the vertical deflection winding 20 in a direction opposite to the cathode flow by merit of the positive power supply voltage applied at terminal 76. Thus, by adjusting potentiometer 54 the current through the vertical deflection winding 20 may be caused to reach a null or flow in either direction, thereby providing a flexible beam positioning control for the camera tube 10.

In further accordance with the operation of the present invention the sawtooth wave form 50 applied to the control electrode 62 is not referenced to datum or ground potential as is commonly found in the prior art. On the contrary, it will be seen that the sawtooth capacitor 44 is returned, as described above, to terminal 74 of the by-pass capacitor 80. However, it will be seen that by-pass capacitor 80 also acts to by-pass, from an A.-C. standpoint, the portion of potentiometer 54 and resistor 56 included in the cathode to ground connection of the vertical deflection winding. The capacitor 80 although being quite small, as compared by what might be required by prior art systems, is valued to offer a relatively low impedance for sixty cycle sawtooth deflection currents with respect to the D.-C. resistance of D.-C. potentiometer 54 or resistance 56. The inherent undesirable deleterious phase shift caused by the presence of capacitor 80 in the A.-C. circuit of the vertical deflection winding is, by means of the present invention, prevented from influencing to any appreciable extent the linearity of the sawtooth deflection current passing through vertical deflection winding, since the phase shift voltage developed across capacitor 80 is also added in a series with the sawtooth voltage driving wave form 50.

In accordance with the present invention the control electrode 62 of the amplifier 64 is made to swing in the same direction by substantially the same amount as the cathode 66 is caused to swing as a result of the undesirable phase shift of voltage developed across capacitor 80. Since both control electrode 62 and cathode 66 swing in the same direction simultaneously, no net distortion in the sawtooth wave form of current through the vertical deduction winding 20 is realized.

It is, therefore, seen that the present invention has not only provided a deflection output amplifier having considerable feedback whereby to reduce distortion products, but also the physical size of the components such as capacitor 80 may be reduced considerably over the prior art.

For example, in prior art deflection systems, where the sawtooth charging capacitor 44 might be connected directly with datum or ground potential the by-pass capacitor 80 would have to assume values in the neighborhood of 1,000 $\mu$f. whereas the return of the capacitor 44, in accordance with the present invention, to the junction 74, allows the value of capacitor 80 to be reduced to 25 $\mu$. This advantage is supplemental to the improved linearity and flexibility in beam positioning provided by the present invention.

It will be seen that by replacing the sawtooth capacitor 44 with a signal wave form generating device of any kind that output of the amplifier 64 may be applied usefully to load instrumentalities other than a cathode ray deflection winding. For example, the cathode ray beam deflection winding 20 may be substituted by a primary of an audio output transformer whose degree of saturation may be controlled by the potentiometer 54.

What is claimed is:

1. In a cathode ray beam deflection system employing an electromagnetic deflection yoke having at least a first and a second input terminals, the combination of: a source of deflection signal having a first and a second output terminals between which is established an output signal at a given output impedance; an output amplifier designated to drive said electromagnetic deflection yoke by said signal derived from said source, said output amplifier having a first and a second input terminals and a first and a second output terminals; means signally connecting said amplifier second input terminal, said amplifier second output terminal and said source second output terminal with one another to form a circuit reference datum; signal coupling means connecting said yoke first terminal with said amplifier first output terminal; a capacitor connected from said yoke second terminal to said amplifier second output terminal to develop across said capacitor a feedback signal representing variations in current flow through said yoke; means signally coupling said deflection signal source first output terminal with said amplifier first input terminal to apply deflection signal in operatively driving relation to said amplifier; and means signally coupling said capacitor with said amplifier first input terminal with such electrical sense as to linearize current flow in said yoke by the combining of said feedback signal with the driving signal waveform applied to said amplifier input terminal.

2. In a driving circuit for a cathode ray beam deflection yoke, the combination of, a driving signal terminal means adapted to display a deflection driving signal voltage wave form at a given output impedance magnitude, a cathode follower amplifier having an input circuit terminal means and an output circuit terminal means, a capacitor connected in series with the deflection yoke to form a combination such that deflection yoke current produces a feedback waveform across said capacitor, means connecting said last named combination in driven relation across the output circuit terminal means of said cathode follower amplifier, means coupled with said capacitor and said driving signal terminal to modify said driving signal with said feedack waveform and means coupling said modified driving signal to the input of said cathode follower amplifier.

3. Apparatus according to claim 2 wherein said cathode follower amplifier includes a vacuum tube so connected to said output circuit that the tube cathode is galvanically connected to said output circuit and wherein said capacitor-yoke combination is connected with a power supply for said cathode follower such that cathode current for said vacuum tube is caused to flow through said deflection yoke for beam positioning purposes.

4. Apparatus according to claim 3 wherein there is additionally provided a power supply connection to said deflection yoke of such polarity as to cause current to flow through said yoke in a direction opposite to cathode current flow and means for controlling the ratio of cathode current flow to opposing current flow whereby to provide a beam positioning influence on the beam deflected by said yoke.

5. In a driving circuit for a cathode ray beam electromagnetic deflection yoke, the combination of, a source of deflection signal having output terminals across which appears a deflection signal, a capacitance means in series with the deflection yoke to form a capacitance means-yoke combination, a deflection amplifier having an output circuit and an input circuit, means connecting said capacitance means-yoke combination across said output circuit, signal coupling means connected between said deflection signal source output terminals and said deflection amplifier input circuit applying deflection signals to said amplifier in driving relation thereto, and signal coupling connection means connected between the terminals of said capacitor and said amplifier input terminals for supplementing the deflection signal applied to said ampilfier with voltage variations appearing across said capacitance means resulting from current flow through said yoke.

6. Apparatus according to claim 5, wherein said deflection amplifier includes an electron discharge tube having at least an anode, cathode and control electrode and wherein said deflection amplifier input circuit includes a connection to said control electrode and wherein said output circuit includes a connection to said cathode, said output circuit and said capacitance means-yoke combination being so connected as to cause at least a part of the operating current of said discharge tube to pass through said deflection yoke and a supplementary power supply connection to said deflection yoke so as to produce a current flow in a direction opposite the operating current of said discharge tube, and means for controlling the magnitude of said opposing current so as to produce beam centering influence on the electron beam deflected by said yoke.

7. A cathode ray beam deflection system, a combination of, a sawtooth charging capacitor connected with means adapted to charge and discharge said capacitor periodically to produce a sawtooth deflection voltage, a deflection output discharge tube, having at least an anode, cathode and control electrode, a datum potential terminal, a power supply terminal positive with respect to said datum terminal, a connection from said power supply terminal to said discharge tube anode, a voltage divider resistance connected from said power supply terminal to said datum potential terminal, a cathode ray beam electromagnetic deflection yoke connected from said discharge tube cathode to a point on said divider resistance, a capacitor connected from said point on said divider resistance to said datum potential terminal, a connection from one terminal of said sawtooth discharge capacitor and said point on said divider resistance and a capacitor connected from said discharge tube control electrode and the other terminal of said sawtooth discharge capacitor.

References Cited in the file of this patent

UNITED STATES PATENTS

| | | |
|---|---|---|
| 2,350,069 | Schrader | May 30, 1944 |
| 2,440,786 | Schade | May 4, 1948 |
| 2,455,283 | Valley | Nov. 30, 1948 |
| 2,463,969 | Hulst | Mar. 8, 1949 |
| 2,466,537 | De Vore | Apr. 5, 1949 |
| 2,483,410 | Grieg | Oct. 4, 1949 |
| 2,517,863 | Froman | Aug. 8, 1950 |
| 2,566,432 | Sziklai | Sept. 4, 1951 |
| 2,587,313 | Grundmann | Feb. 26, 1952 |
| 2,622,228 | Jones | Dec. 16, 1952 |
| 2,642,539 | Lichtman | June 16, 1953 |
| 2,657,332 | Lockhart | Oct. 27, 1953 |